United States Patent [19]

Khanna

[11] Patent Number: 4,861,838

[45] Date of Patent: Aug. 29, 1989

[54] PROCESS FOR PRODUCTION OF QUASI-RANDOM COPOLYMERS FROM HOMOPOLYMERS

[75] Inventor: Yash P. Khanna, Morris, N.J.

[73] Assignee: Allied-Signal Inc., Morris Township, Morris County, N.J.

[21] Appl. No.: 64,366

[22] Filed: Jun. 22, 1987

[51] Int. Cl.$^4$ ............................................. C08L 77/00
[52] U.S. Cl. ................................... 525/432; 524/416; 524/417; 524/423; 524/539; 524/708
[58] Field of Search ................ 525/432; 524/707, 708, 524/416, 539

[56] References Cited

U.S. PATENT DOCUMENTS

| | | | |
|---|---|---|---|
| 4,390,667 | 6/1983 | Aharoni et al. | 525/420 |
| 4,417,031 | 11/1983 | Aharoni et al. | 525/425 |
| 4,417,032 | 11/1983 | Khanna et al. | 525/432 |

FOREIGN PATENT DOCUMENTS

| | | | |
|---|---|---|---|
| 2059060 | 6/1971 | Fed. Rep. of Germany | 525/432 |
| 4627824 | 8/1971 | Japan | 525/432 |
| 51-34298 | 3/1976 | Japan | 525/432 |
| 56-86950 | 7/1981 | Japan | 524/538 |
| 1414118 | 1/1969 | United Kingdom . | |

Primary Examiner—Wilbert J. Briggs, Sr.
Assistant Examiner—A. Carrillo
Attorney, Agent, or Firm—Richard C. Stewart; Gerhard H. Fuchs

[57] ABSTRACT

A process for forming random copolymers which comprises forming a polymer melt containing one or more polyamides and one or more acidic or basic inorganic materials, such as ammonium bisulfate, ammonium biphosphate and sodium biphosphate; and heating said melt for a period of time sufficient to form the desired amount of the copolymer. The random copolymers may be fabricated into films or other products which have desirable properties, and can be useful in making injection molded or extruded products of improved properties.

19 Claims, No Drawings

PROCESS FOR PRODUCTION OF QUASI-RANDOM COPOLYMERS FROM HOMOPOLYMERS

BACKGROUND OF THE INVENTION

1. Field of the Invention

This invention relates to a novel process for producing copolymers using homopolymers as the starting materials. More specifically, this novel process involves reacting a mixture of two or more polyamides, especially poly(caproamide)(nylon 6) and poly(hexamethylene adipamide)(nylon 6,6) and one or more basic or acidic inorganic salts in order to obtain a copolymer from the reaction of the individual homopolymers. The materials obtained by this process are not strictly random or block copolymers but behave similarly to a random system and, therefore, we classify them as "quasi-random" copolymers. For simplicity, we shall refer to them as random copolymers. The random copolymers of the present invention may be fabricated into films or other products which have desirable properties, and can be useful in making injection molded or extruded products of improved properties.

2. Description of the Prior Art

U.S. Pat. No. 4,417,032 discloses a process for forming quasi-random copolymers from two or more homo polyamides. In this process, the homo polyamides are melt blended in the presence of a phosphite promoter.

U.S. Pat. No. 3,509,107 discloses a process for increasing the relative viscosity of polyamide fibers or copolyamides by incorporating a phosphorous or phosphite compound into the polyamide under an inert gas atmosphere. The primary object of U.S. Pat. No. 3,509,107 is to provide a process for increasing the viscosity of polyamide yarn and cord which requires a minimum amount of gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Pat. No. 569,184 discloses a method for producing a random copolymer from nylon 6 and nylon 6,6. The invention described herein teaches that heating a mixture of nylon 6 and nylon 6,6 results in interchange between various sections of the respective polymer molecules with the final product being a random copolymer of nylon 6, and nylon 6,6. In order to produce a random copolymer of nylon 6 and nylon 6,6 British Pat. No. 569,184 teaches that it is necessary to heat the mixture of homopolymers for periods of time up to 8 hours at 285° C. without any catalyst.

U.S. Pat. No. 4,390,667 discloses a process for decreasing the melt index and increasing the viscosity of polyamide fibers via incorporating a phosphate compound into the polyamide and heating the polylamide until the desired changes in the melt index and viscosity occur. The phosphate utilized in U.S. Pat. No. 4,390,667 include substituted aryl phosphates which satisfy certain Hammett sigma values.

U.S. Patent Application Ser. No. 280,563 teaches that polymers of caprolactam with increased viscosity may be produced by reacting in melt a phosphite compound and a caprolactam polymer.

U.S. Pat. No. 4,417,031 discloses a process for preparing block and graft copolymers. The described process involves reacting two or more polyamides, polyesters, acid homopolymers of b - unsaturated carboxylic acids in order to form a graft and/or block copolymer. Included in the patent are copolymers formed from poly(caproamide) and poly(hexamethylene adipamide).

BRIEF DESCRIPTION OF THE INVENTION

In accordance with this invention, there is provided a process for forming random copolymers which comprises the steps of:

a. Forming an intimate mixture of two or more polyamides, and an effective amount of one or more acidic or basic inorganic salts; and b. heating said mixture for a period of time sufficient to produce the desired amount of the desired random copolymer.

The formation of the random copolymer will be accompanied by a decrease in the temperature of the "melting transition of the homopolymers forming the random copolymer and an increase in the size of the melting transition" for the copolymer as the random polymerization progresses as shown by differential scanning calorimetry, culminating in the presence of a "predominating single melt transition" for the copolymer. As used herein, "a melting transition" is temperature zone which covers the whole melting process, e.g. beginning to the end; and as used herein "predominantly a single melting transition" means that the polymer melt exhibits a single major melting transition when analyzed by differential scanning calorimetry which may be accompanied by one or more minor shoulders.

DESCRIPTION OF THE PREFERRED EMBODIMENTS

The process of this invention includes two essential steps. The first step of the process consists of forming an intimate mixture of two or more appropriate polymers as described above and one or more acidic or basic inorganic salts. In the second step of the process, the intimate mixture is heated at a temperature and for a time sufficient to form the desired copolymers. The formation of such copolymer is indicated by a polymeric material having predominantly a single melting transition or a polymeric material having a single melting transition when analyzed by DSC.

In a preferred embodiment of this invention, a molten mixture is formed in the first process step. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of each of the polymers in the mixture. An effective amount of one or more acidic or basic inorganic salts in a liquid or powdered form is added to the melted polymers while at the same time vigorously stirring the melt, or added prior to melting and mixing. Heating is continued until the desired copolymers are formed as indicated by the formation of a polymeric material having a predominantly single melting transition or a polymeric material having a single melting transition.

In the most preferred embodiment, the components of the intimate mixture can be granulated, and the granulated components mixed dry in a suitable mixer, as for example, a tumbler or a Branbury Mixer, or the like, as uniformly as possible. Thereafter, the composition is heated in an extruder until the polymer components are melted. As described above, the mixture is heated in the extruder until the polymeric components react to form a random copolymer. The formation of a random copolymer is evidenced by a single melting point when the extruded polymeric material is analyzed by differential scanning calorimetry. It will be appreciated that the mixing and heating of the blend of homopolymers and acidic or basic inorganic material may be accomplished by other conventional methods known to those skilled in the art.

The order of mixing of the various components of the intimate mixture is not critical. Accordingly, the order of addition of the polymers, the basic or acidic inorganic material and other optional components to be described in more detail hereinbelow, to form the intimate mixture, can be varied as desired.

The process of this invention is preferably carried out in the absence of air, as for example, in the presence of an inert gas, such as argon, carbon dioxide, nitrogen or the like. The process can be carried out in a batchwise or discontinuous fashion, as for example, carrying out the process in a sealed container. Alternatively, the process can be carried out in a continuous fashion in a single processing zone, as for e example, by use of an extruder as described hereinabove, or in a plurality of such reaction zones, in series or parallel.

Reaction temperature can be varied over a wide range. However, it should be appreciated that the process temperature employed in any specific instance will depend on the particular polymer or polymers employed and, in the preferred embodiments should be at least as high as the melting point of the polymers and below the degradation temperature of the polymers. In the preferred embodiments of this invention, the process temperature is such that the polymer will remain in the molten state as the random copolymers are formed. Normally, this can be accomplished in one or two ways. Either the process can be carried out at a temperature which is equal to or greater than the melting point of the desired product; or process temperatures can be increased periodically over the course of the conduct of the process so as to maintain the mixture in the molten state.

In the preferred embodiments of this invention in which the homopolymers are ppolycaprolactam and apoly (hexamethylene adipamide), the reaction temperature of the present invention can vary over a range between about 265° C. and 315° C. Preferably, the reaction temperature should be maintained between about 295° C. and about 305° C., and most preferably the process should be carried out at a temperature of about 300° C. It will be appreciated that this invention and further experiments in regard to this invention have been conducted on a small laboratory scale. Therefore, it should be appreciated that if the invention were conducted on a larger industrial scale that some heat loss might occur. Consequently, an industrial practice of the present invention would possibly require that the extrusion vessel be heated to a temperature greater than 300° C. in order to obtain a reaction temperature of 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogeneous pressure.

The process is carried out for a time sufficient to form the desired random copolymers as is indicated by the decrease in the melt index and increase in the viscosity of the mixture. Reaction times can be varied over a wide range. Usually reaction times will depend on a variety of factors such as the polymeric components, reaction temperatures, the acidic or basic inorganic compound and its concentration, and other factors know to those of skill in the art to affect reaction times. In most instances, the reaction time can vary from a few seconds to 24 hours or more. In the preferred embodiments of this invention, reaction times will vary from about 1 min. to about 2 hrs. and in the particularly preferred embodiments from about 2 mins. to about 30 to 60 mins.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

Acidic or basic inorganic compounds used in the practice of this invention are those which exhibit a pH of less than or greater than 7 when added to water. In the preferred embodiments of this invention, useful materials will exhibit a pH of less than about 6 and greater than about 8 when dissolved in water, and in the particularly preferred embodiments will exhibit a pH or dissolution in water of from about 4 to about 5, from about 9 to about 12. Amongst these particularly preferred embodiments most preferred are acidic inorganic metal or non-metal salts exhibiting a pH of from about 2 to about 5 on dissolution in water.

Illustrative of useful acidic and basic inorganic salts which are useful in the practice of this invention are salts formed by reaction between acids and bases such as ammonium, alkali metal and alkaline earth metal sulfates, carbonates, bisulfates, chlorates, phosphates, biphosphates, bicarbonates, borates, nitrates, iodates and the like, as for example potassium sulfate, potassium bisulfate, sodium phosphate, potassium phosphate, ammonium bisulfate, ammonium sulfate, sodium sulfate, sodium bisulfate, ammonium phosphate, ammonium biphosphate, sodium carbonate, sodium bicarbonate, ammonium carbonate, ammonium bicarbonate, potassium carbonate, potassium bicarbonate, sodium chromate, sodium nitrate, ammonium nitrate, potassium nitrate, sodium iodate, ammonium iodate, potassium iodate, sodium borate, sodium chlorate, ammonium chlorate, barium sulfate, calcium sulfate, calcium nitrate, magnesium sulfate, calcium carbonate and the like.

Preferred acidic or basic inorganic materials are alkali metal and ammonium sulfate bisulfate phosphate and biphosphate salts, and particularly preferred salts are sodium and ammonium sulfate, bisulfate, phosphate and biphosphate. Amongst these particularly preferred embodiments, most preferred are those embodiments in which the acidic or basic inorganic materials are ammonium biphosphate, sodium biphosphate, ammonium sulfate and ammonium bisulfate, with ammonium sulfate being the material of choice.

An effective amount of one or more acidic or basic inorganic materials is employed in forming the intimate mixture. As used herein, "an effective amount" is an amount of the inorganic materials which when added to the polymeric component in accordance with this invention forms a mixture which when heated forms the desired random copolymers to any extent. In the preferred embodiments of this invention, the quantity of the one or more inorganic materials employed is at least about 0.05 weight percent, based on the total weight of the mixture. In the particularly preferred embodiments of this invention, the weight percent of inorganic materials is in the range of from 0.1 to about 10 weight percent, and amongst these particularly preferred embodiments, those in which the quantity of inorganic materials employed is from about 0.2 to about 2 weight percent based on the total weight of the mixture are most preferred.

Polymers which are useful in the conduct of this invention are polyamides. The physical blend of two or more polyamides and one or more basic or acidic inorganic compounds described above produces a random copolymer when the blend is processed in accordance with this invention. While we do not wish to be bound by any theory, it is believed that to a varying extent, the copolymer results from a cleavage of the polyamides into their monomeric units, an a recombination of these moieties in a somewhat random fashion to yield the desired random copolymer. For example, in the case of poly(hexamethylene adipamide) and polycaproamide, the random copolymer results from the cleavage of poly(hexamethylene adipamide) into 1,6-diamino-hexane moieties [—NH—(CH$_2$)$_6$—NH—] and adipoyl moieties [—OC—(CH$_{24}$—C—] and the cleavage of poly(caproamide) into aminocaproyl moieties [HN—(CH$_2$-)$_6$—C—] with three moieties of the two homopolymers recombining in a somewhat random fashion to yield a random copolymer.

The melting point of pure poly(caproamide) is 222° C. and the melting point of pure poly(hexamethylene adipamide) is 261° C. The random copolymer of these materials has a single depressed melting point with respect to the homopolymers. For example, an 80/20 blend of nylon6/nylon 6,6 yields a single melting point of 211° C. The depressed melting points are probably due to the defects in the crystals (lower crystallite thickness) of the major component caused by the minor component.

Illustrative of useful polyamides are those characterized by the pressure of recurring carbonamide groups as an integral part of the polymer chain which are separated from one another by at least two carbon atoms. These polyamides are those prepared by reaction of diaminer and devices having the recurring unit represented by the general formula:

NHCORCONHR$^1$ in which R is an alkylene group of at least about two carbon atoms, preferably from about 2 to about 10 carbon atoms, and R$^1$ is R or aryl. Exemplary of such materials are poly(hexamethylene adipamide) (nylon 6,6) poly(hexamethylene sebecamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly (decamethylene azelamide) (nylon 10,9), poly(decamethylene sebacamide) (nylon 10,10), poly[bis(4-amino cyclohexyl)methane-1,10-decanecarboxamide)] (Quiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lacatams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide).

Various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired random copolymers have been formed. Such optional components include fillers, plasticizers, impace modifiers, colorants, mold release satisfy agents, antioxidants, ultraviolet light stabilizers, lubricants, antistatic agents, fire retardants, and the like. These optional components are well known to those of skill in the art, accordingly, only the preferred optional components will be described herein in detail.

While in this invention the process of this invention provides for formation of the desired random copolymers, it has also been observed that some reduction in molecular weight occurs. In these embodiments of the invention, the copolymer melt can be treated using known techniques, as for example adding to the copolymer melt one or more phosphite compounds and thereafter heating the copolymer melt for a time sufficient to increase the molecular weight of the copolymer to the desired extent. Such process is described in more detail in U.S. Pat. No. 4,417,032 which is incorporated herein by reference.

The random copolymers prepared in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers alumina, aluminum hydrates, feldspar, asbestos, talc, calcium carbonates, clay, carbon black, glass quartz novaculite and other forms of silica, kaolinite, bentonite, garnet, mica, saponite, beidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer and phosphite components, and in the particularly preferred embodiment is in the range of from about 0.30 to about 90 weight percent on the same basis.

It is also very desirable to include a plasticizer of the type known in the art for use with polymer composition. Useful plasticizers will depend on various factors including the type of polymers employed, and include caprolactam, mixtures of ortho and paratoluene ethyl sulfonamides, and the like.

Random copolymers formed in accordance with this invention are useful in the fabrication of films. Films produced in accordance with this invention may be employed as packaging materials, incorporated in laminates and diffusion barrier, cooking bags, cable insulation and the like.

Such polymers are extremely useful as tire cord in pneumatic tires, and the products, filaments, fibers and yarn produced there with have significantly better properties than other polymers.. For example, the fibers have increased tenacity, greater breaking strength and greater resistance to depolymerization. When yarn produced from a random copolymer prepared by the process of this invention is made into tire cord and the cord is then used for pneumatic tire reinforcement, the life span of the tire is markedly increased over that of tires reinforced with cord made from other polymers. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipments, components for the electrical and electronics industries and electrically insulations, car components, circuits, fibers and semifinished products which can be shaped by machining. The use of the materials for coating articles by means of immersion or powder coating processes is also possible as is their use as hot-melt adhesives. The polymer compositions according to the invention are outstandingly suitable for specific applications of all types since their spectrum of properties can be modified in the desired direction in manifold ways.

Compositions prepared in accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, as for example, by lacquering or by the application of protective films. The compositions prepared in accordance with the process of this invention can be made into films with or without filers, which may be transparent or translucent.

The foregoing detailed description of the invention has been given for clarity of understanding only, and no unnecessary limitations are to be understood therefrom. The invention is not limited to the exact details herein shown and described, and will encompass obvious modifications which will occur to those skilled in the art in view of the appended claims.

EXAMPLE I

In Example I, the following general procedures were utilized for sample preparation and property characterization.

(A) Sample Prepartion: Pellets of nylon 6(8207 from Allied Corporation) and nylon 6,6 (Zytel 101L from DuPont) were mixed to form mixtures containing 85 weight percent nylon 6 and 15 weight percent nylon 6,6. The samples were dried overnight under vacuum at 120°C. and three samples were formed by mixing aliquots of the polymer mixture with 1% of $NH_4H_2PO_4$, $NaH_2Po_4$ and $NH_4HSO_4$. The samples were extruded at about 280° C. A Wayne extruder with 4:1 screw and 1¼inch (3.175cm) diameter was employed. The extrudates were pelletized, dried overnight at 120° C. under vacuum, and then molded into films of about 0.1524mm thickness after 10 minutes thermal treatment at 280° C. in the press. For reference purposes, a mixture of 85% by weight of pure nylon 6 and 15% by weight of pure nylon 6,6 were also processed similarly, except that no acidic inorganic salt additive was added.

(B) Thermal Analysis: Differential scanning calorimetry (DCS) was used to obtain the thermal transitions. A DuPont 1090 thermal analyzer with a DSC cell in argon atmosphere was used. A sample of 12 to 13 mg was crimped in an A1 pan and heated at 10° C./minute. After initial heat up, the samples were held at 280° C. for 5 minutes prior to either programmed cooling (10° C./min.) or quenching in liquid nitrogen. A subsequent reheat was carried out under the same conditions as the initial heat up.

In differential scanning calorimetry (DSC), the nylon 6 and nylon 6,6 exhibit a melting temperature (Tm) of about 220° C., respectively. As these two homopolymers undergo amide-exchange reactions, their Tm values decrease. In the event, a minor component e.g., nylon 6.6 is randomly distributed along the chain of the major component nylon 6 (i.e. molecular mixing), the Tm corresponding to nylon 6,6 would be missing and that of nylon 6 would be depressed i.e., less than 220° C. Thus, a reduction in the size of the nylon 6,6 melting peak and a lowering in the Tm of nylon 6, as revealed by DSC, is being used as a criterion for the catalyst's activity.

The melting behavior of the copolymers obtained by the process of this invention is compared with the melting behavior of mixtures of nylon 6 and nylon 6,6 in the absence of the additive. The addition of nylon 6,6 to nylon 6 or vice versa (in the presence of $NH_4H_2PO_4$, $NaH_2PO_4$ and $NH_4HSO_4$) decreases the melting point of the major component. All the copolymer compositions are characterized by a predominantly a single melting transition at between 213° C. to 215° C., while the control containing no additive exhibits a substantial peak at 252° C. indicating the presence of considerable un-copolymerized nylon 6,6 present in the composition.

EXAMPLE II

Pellets of nylon 6/nylon 6,6 formed in Example I containing the additive ammonium phosphate and unprocessed nylon 6/6,6 pellets used in Example I were compression molded into about 5 mil (0.125 mm) films using the following procedure: The pellets were first dried under vacuum at 110° C. overnight. A sample of the nylon 6 pellets was charged into the appropriate windowframe (5 or 50 mil thick) which was encapsulated between Teflon coated aluminum sheets. This assembly was placed between steel discs and molded under pressure at about 300° C. for about 5 minutes. The whole assembly was then cooled in air, and the molded pieces taken out at room temperature. The melting behavior of films formed by the two compositions was evaluated using the DSC "techniques discussed in Example 1," The copolymer composition containing ammonium phosphate was characterized by a predominately single melting transition at 208° C. while the film molded from the control containing no additives exhibited melting transitions at 218° C. and 250° C.

What is claimed is:

1. A process for forming random copolymers which comprises the steps of:
   (a) forming an intimate mixture of two or more polyamides and an amount of one or more acidic inorganic salts which is effective to form a random copolymer;
   (b) heating said mixture for a period of time sufficient to produce the desired amount of random copolymer.

2. A process according to claim 1 wherein said mixture is a molten mixture.

3. A process according to claim 2 wherein at least one of said polyamides is polycaprolactam.

4. A process according to claim 3 wherein said mixture comprises two polyamides, one of said polyamides being polycaprolactam and , the other polyamide being polyhexamethylene adipamide.

5. A process according to claim 4 wherein said mixture is heated at a temperature of from 265° C. to about 315° C.

6. A process according to claim 5 wherein said heating step is conducted in two stages, the first of which is at a temperature from about 265° C. to about 315° C., and the second of which is at a temperature of from abut 240° C. and about 315° C.

7. A process according to claim 6 wherein said first and second stages are conducted at temperatures from about 295° C. to about 305° C.

8. A process according to claim 1 wherein said mixture is heated for a period of time of from about 2 to about 20 minutes.

9. A process according to claim 8 wherein said period of time is from about 2 to about 10 minutes.

10. A process according to claim 1 which further comprises the steps of:
    (c) adding one or more phosphite compounds to said heated mixture; and
    (d) heating said mixture for a period of time sufficient to increase the molecular weight of said copolymer to the desired extent.

11. A process according to claim 1 wherein said acidic salts are selected from the group consisting of salts which exhibit a $_p$H of less than about 6 when dissolved in water.

12. A process according to claim 11 wherein said acidic inorganic salts are selected from the group consisting of salts which exhibit a pH of from 2 to about 5 when dissolved in water.

13. A process according to claim 1 wherein said acidic inorganic salts are selected from the group consisting of alkali metal bisulfates, alkali metal biphosphates, ammonium sulfate, ammonium bisulfate, and ammonium biphosphate.

14. A process according to claim 13 wherein said salts are selected from the group consisting of sodium bisulfate, sodium biphosphate, ammonium sulfate, ammonium bisulfate, and ammonium biphosphate.

15. A process according to claim 13 wherein said salts are selected from the group consisting of ammonium biphosphate, sodium biphosphate, ammonium sulfate and ammonium bisulfate.

16. A process according to claim 15 wherein said acidic salt is ammonium biphosphate.

17. A process according to claim 1 wherein the amount of said salts in said mixture is at least about 0.05 weight percent based on the total weight of said mixture.

18. A process according to claim 17 wherein said amount is from about 0.1 to about 10 weight percent.

19. A process according to claim 18 wherein said amount is from about 0.2 to about 2 weight percent.

* * * * *